United States Patent [19]

Kobold

[11] Patent Number: 4,573,361
[45] Date of Patent: Mar. 4, 1986

[54] FLOAT-TYPE FLOWMETER

[76] Inventor: Klaus Kobold, Sodener Strasse 120, 6233 Kelkheim, Fed. Rep. of Germany

[21] Appl. No.: 657,964

[22] Filed: Oct. 5, 1984

[30] Foreign Application Priority Data

Oct. 5, 1983 [DE] Fed. Rep. of Germany ....... 3336161
Jul. 6, 1984 [DE] Fed. Rep. of Germany ....... 3424870

[51] Int. Cl.⁴ .............................................. G01F 1/28
[52] U.S. Cl. ................................................ 73/861.71
[58] Field of Search ........... 73/861.71, 861.62, 861.61, 73/861.53, 861.54

[56] References Cited

U.S. PATENT DOCUMENTS

| | | | |
|---|---|---|---|
| 3,835,885 | 9/1974 | Kreyenberg | 73/861.71 |
| 4,166,936 | 9/1979 | Tice | 73/861.71 |
| 4,227,409 | 10/1980 | Bingler | 73/861.71 |

FOREIGN PATENT DOCUMENTS

| | | |
|---|---|---|
| 19794 | 11/1882 | Fed. Rep. of Germany . |
| 47030 | 5/1889 | Fed. Rep. of Germany . |
| 202859 | 10/1908 | Fed. Rep. of Germany . |
| 19168 | 8/1953 | Fed. Rep. of Germany . |
| 1272010 | 7/1968 | Fed. Rep. of Germany . |
| 2546303 | 4/1977 | Fed. Rep. of Germany . |
| 2753156 | 5/1980 | Fed. Rep. of Germany . |

OTHER PUBLICATIONS

Zum Stand der Technik: DE-Buch: Hengsten-erg: Messen und Regeln in der Chemischen Technik, Berlin 1957, S.263-264.

Primary Examiner—Donald O. Woodiel
Attorney, Agent, or Firm—Wenderoth, Lind & Ponack

[57] ABSTRACT

A float-type flowmeter includes a tubular housing adapted to have flow therethrough a fluid medium the flow of which is to be measured, and a spring-loaded float positioned within the housing and adapted to be lifted axially therein by the flow of the medium. A ring-shaped gap is defined between the float and the inner surface of the housing. The float includes a hollow cylinder defining axially therethrough an inner flow channel, and an orifice plate extending across the flow channel, the orifice plate having therethrough an orifice defining the narrowest part of the flow channel. The ratio of the thickness of the orifice, measured axially of the cylinder, to the diameter of the orifice, measured transversely of the cylinder, does not exceed 0.5 for flow rates of approximately 0.1 to 5.0 l/min, and is approximately 1.0 for flow rates of between 2 and 20 l/min and above.

52 Claims, 1 Drawing Figure

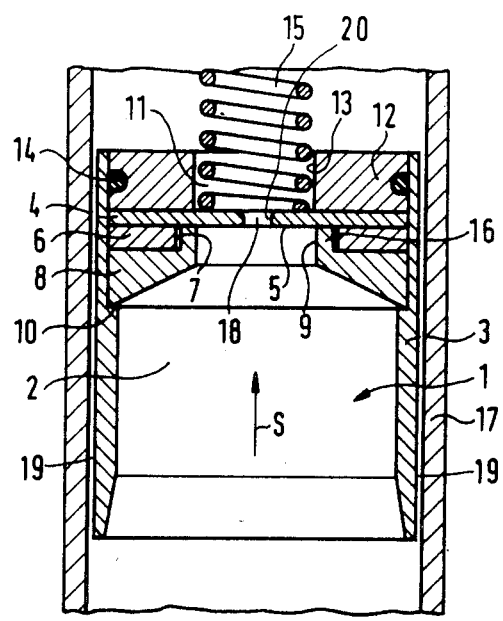

FLOAT-TYPE FLOWMETER

BACKGROUND OF THE INVENTION

The present invention relates to a float-type flowmeter of the type including a tubular housing or member adapted to have flow therethrough a fluid medium the flow of which is to be measured, and a spring-loaded float positioned within the housing and movable axially therein by the flow of the medium, i.e. lifted within the housing by the medium flow.

Float-type flowmeters are known, as exemplified by West German Patent No. 202,859. However, particularly when employed with a medium having a relatively high viscosity, the accuracy of the flowmeter is impaired considerably, particularly if changes in temperature alter the viscosity of the medium.

SUMMARY OF THE INVENTION

Accordingly, it is the object of the present invention to provide a float-type flowmeter whereby it is possible to avoid the adverse influences of viscosity of the flow medium, particularly viscosity variations resulting from temperature changes.

This object is achieved in accordance with the present invention by the provision of a float-type flowmeter including a tubular housing adapted to have flow therethrough a fluid medium the flow of which is to be measured, and a spring-loaded float positioned within the housing and adapted to be lifted axially therein by the flow of the medium, with a ring-shaped gap being defined between the float and the inner surface of the housing. The float includes a hollow cylinder defining axially therethrough an inner flow channel, and an orifice plate extending across the flow channel, the orifice plate having therethrough an orifice defining the narrowest part of the flow channel, the orifice remaining open during axial movement of the float within the housing.

In accordance with an important feature of the present invention, the ratio of the thickness of the orifice, measured axially of the cylinder, to the diameter of the orifice, measured transversely of the cylinder, is of specified values, depending upon the approximate flow rate of the fluid medium through the flow meter. Thus, when the flow rate of the fluid medium is relatively low, then such ratio is relatively low. On the other hand, when the fluid medium flow rate is relatively high, or at least not extremely low, then the ratio may be higher.

More specifically, for fluid medium flow rates of from approximately 0.1 to 5.0 l/min, the ratio is maintained to be no more than 0.5, and extremely good results in accuracy of measurement are thereby achieved. Particularly good results are achieved if the ratio is between 0.1 and 0.3, further preferably approximately 0.2.

At higher fluid medium flow rates, or at least at fluid medium flow rates which are not extremely low, the ratio may be approximately unity, i.e. 1.0. This ratio is satisfactory for fluid medium flow rates of between approximately 2 and 20 l/min and above.

Although there is some overlap in the above discussed flow rates, in this area of overlap, either of the above discussed ratios provides satisfactory measurement results.

In accordance with the present invention the orifice is "small" and by this term is meant that the diameter of the orifice is very substantially smaller than the transverse area of the remaining inner flow channel of the float. The axial dimension or thickness of the orifice plate defining the orifice is small compared to the orifice diameter, taking into account the nature of the material of the orifice plate and the rigidity that still can be achieved thereby. A surprising result of this reduction in orifice thickness is that it is possible to eliminate the effect on the flow measurement of viscosity of the medium The thickness of the orifice, and thereby the thickness of the orifice plate if it is of uniform thickness, preferably is between 0.01 mm and 10 mm. Suitable materials for the orifice plate are steel or aluminum.

In accordance with a further feature of the present invention, the radial thickness of the ring-shaped gap between the outer surface of the float and the inner surface of the tubular housing is from 0.01 mm to 0.3 mm, preferably approximately 0.05 mm. It has been determined that this dimension has an important influence on the accuracy of the measurement of the flow rate.

In accordance with a further feature of the present invention, the flow channel is partially defined by an annular surface of the orifice plate upstream of the orifice with respect to the direction of flow of the medium, and the ratio of the orifice diameter to the diameter of this annular surface is from 0.01 to 0.95, preferably from 0.04 to 0.4.

An additional surprising feature of the present invention is that measurement accuracy additionally can be improved by defining the orifice with a rounded edge of the orifice plate, and preferably this rounded edge is semi-circular in cross section.

In a preferred arrangement of the present invention, the orifice plate is removably mounted in the hollow cylinder as a replaceable or exchangeable component. Thus, not only is it possible to provide an initial assembly using relatively simple parts, but additionally the orifice plate can be exchanged for a different plate having a different orifice cross section so as to enable the selection of another measuring range, taking into account the flow patterns and the viscosity of the medium to be measured.

To further improve the suitability of the flowmeter as a high precision flow monitor, one or more preferably axially magnetized magnetic rings may be provided, each ring having therethrough a port having a diameter substantially greater than the orifice diameter. Such ring or rings may be placed in the hollow cylinder upstream and/or downstream of the orifice plate. Plural magnetic rings arranged one after the other can form a substantial portion of the length of the float such that, in the case of an upper abutment being placed in the float housing, an electro-optical signal unit may remain switched on above a given flow rate at all times and be switched off only as soon as it drops below a predetermined value.

In accordance with another embodiment of the present invention, the orifice plate itself may be a magnetic disk, preferably axially magnetized. During axial movement of the float in the housing, the magnetic disk can be used in a simple manner to actuate a dry-reed contact positioned on the outer surface of the housing at a predetermined height and located in the circuit of an electro-optical signal unit and/or to magnetically actuate the pointed of a pointer instrument mounted directly on the housing. The flowmeter also can serve simultaneously as a flow monitor. Oxide ceramics or plastic based magnetic materials are suitable as magnetic materials, based on Cr/Co/Fe or Al/Ni/Eo, Co/Sm (e.g. Co$_5$Sm), Pt/Co.

In accordance with a further feature of the present invention, a support ring supports the orifice plate and/or the at least one magnetic ring. The support ring has therethrough a port having a diameter substantially greater than the orifice diameter. However, the orifice plate and/or the magnetic ring or rings also can be retained on an inner shoulder of the hollow cylinder. For example, the support ring can be carried on an inner shoulder of the hollow cylinder, preferably directed downstream with respect to the direction of medium flow. The orifice plate itself can be retained in the hollow cylinder, for example by means of a holding ring having therethrough a port the inside diameter of which is substantially greater than the orifice diameter, the holding ring abutting on the inner shoulder or on the support ring or on the at least one magnetic ring, on respective sides thereof directed downstream. The holding ring can be inserted into the hollow cylinder and be locked therein by mechanical forces and through its shape, for example by providing it with a seal ring. The holding ring also can be fixed by means such as screws, glue, welding, or any other such means.

In accordance with a further feature of the present invention, the float is suspended and/or supported by a spring and is arranged to move axially in the housing throughout its length. The housing has a substantially uniform inner diameter, with the radial clearance between the float and the housing being defined only by the ring-shaped gap. The spring may be tension or compression loaded and absorbs the weight of the float. This is of advantage for low flow rates. When the flow increases, the counterforce acting on the float increases until a new balance with relation to the flow is achieved. The float then comes to rest, and indicates, in a known manner, the flow rate with a high degree of accuracy. Advantageously, the spring may be a conical helical spring with corresponding characteristics. Thus, the effective range can be increased by a factor of more than two as opposed to the use of a cylindrical helical spring.

If the flow rates are low, it is of advantage that the support ring includes a conical surface converging in the downstream direction, preferably from the inner surface of the hollow cylinder to the port through the support ring.

For ease of assembly, the support ring may include a centering projection extending axially in the downstream direction, with the at least one magnetic ring surrounding and being centered by such projection.

It also is within the scope of the present invention to insert the support ring and/or the at least one magnetic ring and/or the orifice plate into the hollow cylinder with a negligible radial clearance therebetween and to fix such elements in position between the inner shoulder of the cylinder and the holding ring. In this way, the various elements of the float can be mounted with ease, and the orifice plate readily can be exchanged for another plate.

BRIEF DESCRIPTION OF THE DRAWING

Further objects, features, and advantages of the present invention will be apparent from the following detailed description of one embodiment thereof, with reference to the accompanying drawing, wherein:

The single drawing FIGURE is a partial vertical section through a float-type flowmeter according to the present invention.

DETAILED DESCRIPTION OF THE INVENTION

The float-type flowmeter includes a cylindrical tubular housing 17 adapted to have flow therethrough a fluid medium the flow of which is to be measured. The direction of flow is indicated by arrow S, i.e. upwardly. In the illustrated arrangement, the inner diameter of housing 17 is substantially constant.

A float 1 is carried axially within housing 17, with a ring-shaped gap 19 being maintained between the exterior surface of float 1 and the inner surface of housing 17. Float 1 has a substantially cylindrical exterior surface. The float is adapted to be lifted axially upwardly by the medium flow.

The float is formed by a hollow cylinder 3 defining therethrough an axial inner flow channel 2. An orifice plate 4 extends across the flow channel 2 and has therethrough an orifice 18 defining the narrowest part of flow channel 2. The orifice and the flow channel remain open at all times during the axial movement of the float within the housing.

The ratio of the thickness of orifice 18, measured axially of the cylinder and in the illustrated arrangement equal to the thickness of orifice plate 4 or at least the area thereof defining the orifice 18, is small compared to the diameter of orifice 18, measured transversely. Such dimensions of course must take into account the quality of the material forming the orifice plate 4. Such ratio somewhat depends on the flow rates of the fluid medium. At low flow rates, i.e. of approximately 0.1 to 5.0 l/min, the ratio may be maintained to be no more than 0.5, preferably from 0.1 to 0.3, and more preferably approximately 0.2. At higher flow rates however, the ratio may be approximately 1.0. This ratio is satisfactory for flow rates of between approximately 2 and 20 l/min and above. The orifice thickness preferably is from 0.01 mm to 10 mm. Additionally, the orifice 18 has a small diameter compared to the diameters of the remaining portions of flow channel 2, and in particular with respect to the effective upstream annular surface 5 of orifice plate 4. More particularly, the ratio of the orifice diameter to the diameter of annular surface 5 is from 0.01 to 0.95, preferably from 0.04 to 0.4.

The radial thickness of the ring-shaped gap 19 is from 0.01 mm to 0.3 mm, preferably approximately 0.05 mm.

The orifice 18 is defined by a rounded edge of orifice plate 4, and preferably such rounded edge is semi-circular in cross section.

The orifice plate is mounted in hollow cylinder 3 in a manner to be exchangeable as a separate component. Thus, cylinder 3 has an inner shoulder 10 facing in the downstream direction, i.e. toward an upper outlet opening 11 of cylinder 3. A support ring 8 is supported on inner shoulder 10. In the illustrated arrangement, support ring 8 has a conical surface converging in the downstream direction from the shoulder 10 to a port 9. The diameter of port 9 is substantially greater than the diameter of orifice 18. The support ring 8 has a centering collar or projection 16 facing axially in the downstream direction. A magnetic ring 6 has therethrough a port 7 receiving projection 16, the ring 6 surrounding and being centered by projection 16. During axial height adjustment, magnetic ring 6 serves to actuate a dry-reed contact of an electro-optical or acoustical signal unit and/or the pointer of a pointer instrument which may be located at a predetermined height on housing 17. The downstream end of projection 16 is flush with the downstream surface of magnetic ring 6.

Instead of only a single magnetic ring 6, there may be provided a plurality of magnetic rings placed axially one on top of the other, either upstream or downstream of orifice plate 4. In such case, the inner shoulder and support ring 8 would be positioned correspondingly lower with respect to the cylinder 3.

In the illustrated arrangement, orifice plate 4 lies on and is supported by support ring 8 and magnetic ring 6. Plate 4 is retained at the top or downstream side by a holding ring 12 so that plate 4 will not move axially with respect to cylinder 3. A seal ring 14 is located in an external peripheral groove formed in holding ring 12, such that ring 12 can be filed in position in cylinder 3 and is locked therein by mechanical forces and due to its shape. Holding ring 12 has therethrough a port 13 which defines the outlet opening 11, and the diameter of port 13 is substantially greater than the diameter of orifice 18.

The float 1 is suspended in housing 17 by the lower end of a spring 15 which is a helical spring, and the upper end of which (not shown) may be fixed to a corresponding recess of an upper screw connection of the housing 17. Spring 15 extends into port 13. The illustrated arrangement shows a cylindrical helical spring, but the spring also may be conical. Thus, in the illustrated arrangement the float 1 is suspended in housing 17 by spring 15. However, the float 1 also could be supported at the bottom thereof by a spring. The float is lifted within the housing 17 by the flow of the medium against the force of the spring until a balance is achieved.

In the illustrated arrangement, the outer diameters of orifice plate 4, magnetic ring 6 and support ring 8 are only slightly smaller than the corresponding inner diameter of the hollow cylinder 3, therefore such elements are held in the cylinder without any substantial radial clearance.

Due to the provision of the conical inlet surface of support ring 8, the inner diameter of port 9 is substantially smaller than the inner diameter of cylinder 3. The same is true of the inner diameter of ports 7 and 13 of magnetic ring 6 and holding ring 12. With higher flow rates, this conical inlet surface can be eliminated. In such case, the inner diameters of ports 7, 9 and 13 would be only slightly smaller than the inner diameter of the hollow cylinder 3 itself.

Although the present invention has been described and illustrated with respect to preferred features thereof, it is to be understood that many modifications and changes may be made to the described and illustrated arrangements without departing from the scope of the present invention.

I claim:

1. A float-type flowmeter comprising:
   a tubular housing adapted to have flow therethrough a fluid medium the flow of which is to be measured; and
   a spring-loaded float positioned within said housing and adapted to be lifted axially therein by the flow of the medium, with a ring-shaped gap being defined between said float and the inner surface of said housing, said float comprising a hollow cylinder defining axially therethrough an inner flow channel, and an orifice plate extending across said flow channel, said orifice plate having therethrough an orifice defining the narrowest part of said flow channel, said orifice remaining open during axial movement of said float within said housing, and the ratio of the thickness of said orifice, measured axially of said cylinder, to the diameter of said orifice, measured transversely of said cylinder, for flow rates of the fluid medium of approximately 0.1 to 5.0 l/min, not exceeding 0.5.

2. A flowmeter as claimed in claim 1, wherein said ratio is from 0.1 to 0.3.

3. A flowmeter as claimed in claim 2, wherein said ratio is approximately 0.2.

4. A flowmeter as claimed in claim 1, wherein said orifice thickness is from 0.01 mm to 10 mm.

5. A flowmeter as claimed in claim 1, wherein the radial thickness of said ring-shaped gap is from 0.01 mm to 0.3 mm.

6. A flowmeter as claimed in claim 5, wherein said radial thickness is approximately 0.05 mm.

7. A flowmeter as claimed in claim 1, wherein said flow channel is partially defined by an annular surface of said orifice plate upstream of said orifice, with respect to the direction of flow of the medium, the ratio of said orifice diameter to the diameter of said annular surface being from 0.01 to 0.95.

8. A flowmeter as claimed in claim 7, wherein said last-mentioned ratio is from 0.04 to 0.4.

9. A flowmeter as claimed in claim 1, wherein said orifice is defined by a rounded edge of said orifice plate.

10. A flowmeter as claimed in claim 9, wherein said rounded edge is semi-circular in cross section.

11. A flowmeter as claimed in claim 1, further comprising means for removably mounting said orifice plate on said cylinder as a replaceable component.

12. A flowmeter as claimed in claim 1, wherein said float further comprises at least one magnetic ring mounted adjacent said orifice plate, said ring having therethrough a port having a diameter substantially greater than said orifice diameter.

13. A flowmeter as claimed in claim 12, wherein said magnetic ring is axially magnetized.

14. A flowmeter as claimed in claim 12, wherein said float further comprises a support ring supporting said orifice plate and said magnetic ring, said support ring having therethrough a port having a diameter substantially greater than said orifice diameter.

15. A flowmeter as claimed in claim 14, wherein said cylinder includes an inner shoulder, and said support ring is supported on said shoulder.

16. A flowmeter as claimed in claim 15, wherein said shoulder faces downstream with respect to the direction of medium flow.

17. A flowmeter as claimed in claim 14, wherein said support ring has a conical surface converging downstream with respect to the direction of medium flow toward said port of said support ring.

18. A flowmeter as claimed in claim 17, wherein said conical surface converges from the inner surface of said cylinder.

19. A flowmeter as claimed in claim 14, wherein said support ring includes an axially extending centering projection, said magnetic ring surrounding said projection and being centered thereby.

20. A flowmeter as claimed in claim 14, wherein said support ring, said magnetic ring and said orifice plate fit within said cylinder with negligible radial clearance therebetween.

21. A flowmeter as claimed in claim 20, further comprising a holding ring removably inserted in said cylinder and retaining therein said orifice plate, said magnetic ring and said support ring.

22. A flowmeter as claimed in claim 1, wherein said float further comprises a holding ring removably inserted in said cylinder and retaining therein said orifice plate, said holding ring having therethrough a port having a diameter substantially greater than said orifice diameter.

23. A flowmeter as claimed in claim 22, wherein said holding ring includes an outer annular seal ring retaining said holding ring in said cylinder.

24. A flowmeter as claimed in claim 1, wherein said orifice plate comprises a magnetic member.

25. A flowmeter as claimed in claim 24, wherein said orifice plate is axially magnetized.

26. A flowmeter as claimed in claim 1, further comprising an axially compressible spring mounting said float in said housing.

27. A flowmeter as claimed in claim 26, wherein said spring suspends said float within said housing.

28. A float-type flowmeter comprising:
a tubular housing adapted to have flow therethrough a fluid medium the flow of which is to be measured; and
a spring-loaded float positioned within said housing and adapted to be lifted axially therein by the flow of the medium, with a ring-shaped gap being defined between said float and the inner surface of said housing, said float comprising a hollow cylinder defining axially therethrough an inner flow channel, and an orifice plate extending across said flow channel, said orifice plate having therethrough an orifice defining the narrowest part of said flow channel, said orifice remaining open during axial movement of said float within said housing, and the ratio of the thickness of said orifice, measured axially of said cylinder, to the diameter of said orifice, measured transversely of said cylinder, for flow rates of the fluid medium of between 2 and 20 l/min and above, being approximately 1.0.

29. A flowmeter as claimed in claim 28, wherein said orifice thickness is from 0.01 mm to 10 mm.

30. A flowmeter as claimed in claim 28, wherein the radial thickness of said ring-shaped gap is from 0.01 mm to 0.3 mm.

31. A flowmeter as claimed in claim 30, wherein said radial thickness is approximately 0.05 mm.

32. A flowmeter as claimed in claim 28, wherein said flow channel is partially defined by an annular surface of said orifice plate upstream of said orifice, with respect to the direction of flow of the medium, the ratio of said orifice diameter to the diameter of said annular surface being from 0.01 to 0.95.

33. A flowmeter as claimed in claim 32, wherein said last-mentioned ratio is from 0.04 to 0.4.

34. A flowmeter as claimed in claim 28, wherein said orifice is defined by a rounded edge of said orifice plate.

35. A flowmeter as claimed in claim 34, wherein said rounded edge is semi-circular in cross section.

36. A flowmeter as claimed in claim 28, further comprising means for removably mounting said orifice plate on said cylinder as a replaceable component.

37. A flowmeter as claimed in claim 28, wherein said float further comprises at least one magnetic ring mounted adjacent said orifice plate, said ring having therethrough a port having a diameter substantially greater than said orifice diameter.

38. A flowmeter as claimed in claim 37, wherein said magnetic ring is axially magnetized.

39. A flowmeter as claimed in claim 37, wherein said float further comprises a support ring supporting said orifice plate and said magnetic ring, said support ring having therethrough a port having a diameter substantially greater than said orifice diameter.

40. A flowmeter as claimed in claim 39, wherein said cylinder includes an inner shoulder, and said support ring is supported on said shoulder.

41. A flowmeter as claimed in claim 40, wherein said shoulder faces downstream with respect to the direction of medium flow.

42. A flowmeter as claimed in claim 39, wherein said support ring has a conical surface converging downstream with respect to the direction of medium flow toward said port of said support ring.

43. A flowmeter as claimed in claim 42, wherein said conical surface converges from the inner surface of said cylinder.

44. A flowmeter as claimed in claim 39, wherein said support ring includes an axially extending centering projection, said magnetic ring surrounding said projection and being centered thereby.

45. A flowmeter as claimed in claim 39, wherein said support ring, said magnetic ring and said orifice plate fit within said cylinder with negligible radial clearance therebetween.

46. A flowmeter as claimed in claim 45, further comprising a holding ring removably inserted in said cylinder and retaining therein said orifice plate, said magnetic ring and said support ring.

47. A flowmeter as claimed in claim 28, wherein said float further comprises a holding ring removably inserted in said cylinder and retaining therein said orifice plate, said holding ring having therethrough a port having a diameter substantially greater than said orifice diameter.

48. A flowmeter as claimed in claim 47, wherein said holding ring includes an outer annular seal ring retaining said holding ring in said cylinder.

49. A flowmeter as claimed in claim 28, wherein said orifice plate comprises a magnetic member.

50. A flowmeter as claimed in claim 49, wherein said orifice plate is axially magnetized.

51. A flowmeter as claimed in claim 28, further comprising an axially compressible spring mounting said float in said housing.

52. A flowmeter as claimed in claim 51, wherein said spring suspends said float within said housing.

* * * * *